United States Patent
Li et al.

(10) Patent No.: US 10,667,298 B2
(45) Date of Patent: May 26, 2020

(54) CHANNEL ASSESSMENT METHOD AND APPARATUS, TERMINAL, AND BASE STATION

(71) Applicant: Yulong Computer Telecommunication Scientific (Shenzhen) Co., Ltd., Guangdong (CN)

(72) Inventors: Mingju Li, Guangdong (CN); Yajun Zhu, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/068,648

(22) PCT Filed: Jul. 30, 2016

(86) PCT No.: PCT/CN2016/092468
§ 371 (c)(1),
(2) Date: Jul. 6, 2018

(87) PCT Pub. No.: WO2017/117989
PCT Pub. Date: Jul. 13, 2017

(65) Prior Publication Data
US 2019/0029045 A1    Jan. 24, 2019

(30) Foreign Application Priority Data
Jan. 8, 2016 (CN) .......................... 2016 1 0013298

(51) Int. Cl.
*H04W 4/00* (2018.01)
*H04W 74/08* (2009.01)
(Continued)

(52) U.S. Cl.
CPC ....... *H04W 74/0816* (2013.01); *H04W 16/14* (2013.01); *H04W 72/1289* (2013.01); *H04W 74/08* (2013.01); *H04W 74/0808* (2013.01)

(58) Field of Classification Search
None
See application file for complete search history.

(56) References Cited

U.S. PATENT DOCUMENTS

2014/0362780 A1    12/2014  Malladi et al.
2016/0337094 A1*  11/2016  Andreoli-Fang .......................... H04W 72/1284
(Continued)

FOREIGN PATENT DOCUMENTS

CN    104486013 A    4/2015
CN    104540230 A    4/2015
(Continued)

OTHER PUBLICATIONS

International Search Report dated Oct. 26, 2016 in connection with Application No. PCT/CN2016/092468.
(Continued)

*Primary Examiner* — Clemence S Han
(74) *Attorney, Agent, or Firm* — Wolf, Greenfield & Sacks, P.C.

(57) ABSTRACT

A channel assessment method, a channel assessment apparatus, a terminal and a base station when a LTE system operates in an unlicensed band are provided, where the method includes: receiving an uplink scheduling instruction transmitted in a subframe n by a base station, where the uplink scheduling instruction is configured to instruct a terminal to transmit uplink data in a subframe n+i by using an allocated resource; and setting channel assessment time in a subframe after the subframe n and before the subframe n+i, so as to detect a clear or busy state of an uplink channel to be occupied by the terminal.

17 Claims, 3 Drawing Sheets

(51) Int. Cl.
*H04W 16/14* (2009.01)
*H04W 72/12* (2009.01)

(56) References Cited

U.S. PATENT DOCUMENTS

| | | | | |
|---|---|---|---|---|
| 2016/0338096 A1* | 11/2016 | Vajapeyam | ............ | H04L 1/1861 |
| 2018/0206269 A1* | 7/2018 | Bhorkar | ................ | H04W 72/14 |
| 2018/0310332 A1* | 10/2018 | Ahn | ....................... | H04W 28/26 |
| 2018/0332618 A1* | 11/2018 | Kakishima | ............ | H04B 7/0626 |

FOREIGN PATENT DOCUMENTS

| | | | |
|---|---|---|---|
| CN | 105072690 A | | 11/2015 |
| CN | 105657847 A | | 6/2016 |
| CN | 105722097 A | | 6/2016 |
| EP | 2723009 A2 | | 4/2014 |

OTHER PUBLICATIONS

Extended European Search Report for European Application No. 16883123.8 dated Nov. 2, 2018.

[No Author Listed], Discussion on UL HARQ operation for LAA. 3GPP TSG RAN WG1 Meeting #80-bis. ETRI. Apr. 2015. 8 pages. URL:http://www.3gpp.org/ftp/tsg_ran/WG1_RL1/TSGR1_80b/Docs/ [retrieved on Apr. 10, 2015].

[No Author Listed], Evaluation results for DL+UL LAA and Wi-Fi. 3GPP TSG RAN WG1 Meeting #81. Fujitsu. May 2015. 6 pages. URL:http://www.3gpp.org/ftp/tsg_ran/WG1_RL1/TSGR1_81/Docs/ [retrieved on May 15, 2015].

[No Author Listed], UL LBT design in LAA. 3GPP TSG RAN WG1 Meeting #83. LG Electronics. Nov. 2015. 6 pages. URL:http://www.3gpp.org/ftp/Meetings_3GPP_SYNC/RAN1/Docs/ [retrieved on Nov. 15, 2015].

\* cited by examiner

CHANNEL ASSESSMENT METHOD AND APPARATUS, TERMINAL, AND BASE STATION

CROSS REFERENCE TO RELATED APPLICATIONS

This is a National Stage Application filed under 35 U.S.C. 371, of International Patent Application No. PCT/CN2016/092468, filed on Jul. 30, 2016, which claims the priority to the Chinese patent application No. 201610013298.9, entitled "Channel Assessment Method and apparatus, Terminal, And Base Station", filed on Jan. 8, 2016 in the Chinese Patent Office, contents of both of which are hereby incorporated by reference in their entireties.

TECHNICAL FIELD

The present disclosure relates to the technical field of communication, and relates to, for example, a channel assessment method, a channel assessment apparatus and a base station.

BACKGROUND

At present, the 3rd generation partnership project (3GPP) proposes the concept of licensed-assisted access (LAA), which uses an unlicensed spectrum with the help of a licensed spectrum of long term evolution (LTE). However, when a LTE network uses an unlicensed band, it is necessary to ensure that a LAA system can coexist with related access technologies (such as Wi-Fi) on a fair and friendly basis. However, in the traditional LTE system, there is no listen before talk (LBT) mechanism to avoid collision. In order to coexist with the Wi-Fi, a LTE system needs a LBT mechanism. In this way, if it is detected that a channel is in a busy state on the unlicensed spectrum, the LTE system cannot occupy the band. If it is detected that the channel is in a clear state, the LTE system can occupy the band.

Based on the above problems, a LBT mechanism of load based equipment (LBE) is proposed in the related art. The LBT mechanism of the LBE is cycle-free. As long as a service arrives, a clear channel assessment (CCA) is triggered.

For uplink transmission of the LAA system, since the uplink transmission is based on scheduling, if an uplink grant (UL grant) is transmitted in a subframe n, then the scheduled user equipment (UE) may transmit uplink data in a subframe n+i by using a resource block (RB) indicated in the UL grant.

Since the uplink transmission of the UE in a subframe n+4 is performed based on the UL grant transmitted by a base station in the subframe n, if uplink LBT is based on a load, it is not clear when the scheduled UE starts uplink CCA, i.e. how to configure a starting point of the uplink CCA time of the scheduled UE received the UL grant.

SUMMARY

The present disclosure proposes a channel assessment solution when a LTE system operates in an unlicensed band, so that a terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

According to a first aspect, the present disclosure proposes a channel assessment method when a long term evolution (LTE) system operates in an unlicensed band, including:

receiving an uplink scheduling instruction transmitted by a base station in a subframe n, where the uplink scheduling instruction is configured to instruct a terminal to transmit uplink data in a subframe n+i by using an allocated resource; and setting channel assessment time in a subframe after the subframe n and before the subframe n+i, so as to detect a clear or busy state of an uplink channel to be occupied by the terminal.

In this technical solution, the channel assessment time is set in the subframe after the subframe n and before the subframe n+i, so that the terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

Alternatively, the setting channel assessment time in a subframe after the subframe n and before the subframe n+i includes:

setting a starting point of the channel assessment time at a starting point of any one subframe after the subframe n and before the subframe n+i.

Alternatively, the setting channel assessment time in a subframe after the subframe n and before the subframe n+i includes:

setting a starting point of the channel assessment time at a starting point of a designated symbol within any one subframe after the subframe n and before the subframe n+i.

Alternatively, the designated symbol includes a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, or a thirteenth symbol within the any one subframe.

Alternatively, the starting point of the channel assessment time may be set at a starting point of any one subframe, that is, the first symbol within the any one subframe; or uplink CCA may be started when a last subframe transmitted at a downlink (that is, a downlink ending partial subframe) ends. Because when a structure of a downlink pilot time slot (DwPTS) is multiplexed by the ending partial subframe, the third symbol, the sixth symbol, the ninth symbol, the tenth symbol, the eleventh symbol and the twelfth symbols may be occupied, the starting point of the channel assessment time may be set at a starting point of the fourth symbol, the seventh symbol, the tenth symbol, the eleventh symbol or the thirteenth symbol of any one subframe.

Alternatively, the method further includes: if it is detected that the uplink channel is in a clear state before the starting point of the subframe n+i, transmitting an initial signal or a reservation signal, and occupying the uplink channel at the starting point of the subframe n+i to transmit the uplink data; or if it is detected that the uplink channel is in the clear state before the starting point of the subframe n+i, performing a self-deferral process, and after the self-deferral process is performed and before the starting point of the subframe n+i, performing a channel assessment process for a predetermined duration; when it is detected that the uplink channel is in the clear state in the channel assessment process for the predetermined duration, occupying the uplink channel to transmit the uplink data; and when it is detected that the uplink channel is in a busy state in the channel assessment process for the predetermined duration, not transmitting the uplink data.

Alternatively, the predetermined duration is 16 μs+M×9 μs, where M is equal to 1 or 2.

Alternatively, the method further includes: receiving radio resource control (RRC) signaling for indicating a starting point of the channel assessment time transmitted by the base station, so as to determine the starting point of the channel assessment time according to the RRC signaling; or receiving multiple configuration manners of the starting point of the channel assessment time and identification codes corresponding to the configuration manners, which are transmitted by the base station through the RRC signaling, and receiving a target identification code transmitted by the base station through downlink control information (DCI) signaling, so as to determine the starting point of the channel assessment time according to a configuration manner corresponding to the target identification code; or receiving the target identification code transmitted by the base station through the DCI signaling, so as to determine the configuration manner corresponding to the target identification code according to a correspondence between identification codes and the configuration manners of the starting point of the channel assessment time, which is stored in the terminal, and determine the starting point of the channel assessment time according to the configuration manner corresponding to the target identification code; or listening to signaling for indicating that the subframe ends transmitted by the base station, so as to determine the starting point of the channel assessment time according to a last subframe of downlink transmission and the number of symbols occupied by the last subframe, which are indicated by the signaling for indicating that the subframe ends.

In this technical solution, the starting point of the channel assessment time of the terminal may be set by the base station through the signaling, that is, the channel assessment time of the terminal is controlled by the base station, and then the base station can ensure that the probability of preempting the channel by the terminal is maximized while making the terminal save power by setting the channel assessment time of the terminal.

Alternatively, the value of i is 1, 2, 3, or 4.

Alternatively, the method further includes: when any one subframe occupies the uplink channel to transmit the uplink data, indicating that the time starting point for transmitting the uplink data is the starting point of any one subframe and lengths of fourteen symbols or lengths of thirteen symbols of any one subframe are continuously occupied.

According to a second aspect, the present disclosure further proposes a channel assessment method when a LTE system operates in an unlicensed band, including:

transmitting an uplink scheduling instruction in a subframe n to a terminal to instruct the terminal to transmit uplink data in a subframe n+i by using an allocated resource; and notifying a starting point of channel assessment time to the terminal, so that the terminal sets the channel assessment time in a subframe after the subframe n and before the subframe n+i.

In this technical solution, the base station notifies the terminal of the starting point of the channel assessment time, so that the terminal can specify a starting point of a load-based CCA time in scheduling-based uplink transmission, that is, the channel assessment time of the terminal is limited by the base station, and thus the problem of higher power consumption caused by blindly performing the CCA by the terminal can be avoided, and the probability of preempting a channel by the terminal can be increased.

Alternatively, the notifying the terminal of a starting point of channel assessment time to the terminal includes:

transmitting radio resource control (RRC) signaling for indicating the starting point of the channel assessment time to the terminal, so that the terminal determines the starting point of the channel assessment time according to the RRC signaling; or transmitting multiple configuration manners of the starting point of the channel assessment time and identification codes corresponding to the configuration manners to the terminal through the RRC signaling, and transmitting a target identification code to the terminal through a DCI signaling, so that the terminal determines the starting point of the channel assessment time according to the configuration manner corresponding to the target identification code; or transmitting the target identification code to the terminal through the DCI signaling, so that the terminal determines a configuration manner corresponding to the target identification code according to a correspondence between identification codes and the configuration manners of the starting point of the channel assessment time, which is stored in the terminal, and determines the starting point of the channel assessment time according to the configuration manner corresponding to the target identification code; or transmitting signaling for indicating that the subframe ends to the terminal, wherein the signaling for indicating that the subframe ends is configured to indicate a last subframe of downlink transmission and the number of symbols occupied by the last subframe, so that the terminal determines the starting point of the channel assessment time according to the last subframe and the number of symbols occupied by the last subframe.

According to a third aspect, the present disclosure further proposes a channel assessment apparatus when a LTE system operates in an unlicensed band, including:

a reception unit, which is configured to receive an uplink scheduling instruction transmitted by a base station in a subframe n, where the uplink scheduling instruction is configured to instruct a terminal to transmit uplink data in a subframe n+i by using an allocated resource; and a channel assessment unit, which is configured to set channel assessment time in a subframe after the subframe n and before the subframe n+i, so as to detect a clear or busy state of an uplink channel to be occupied by the terminal.

In this technical solution, the channel assessment time is set in the subframe after the subframe n and before the subframe n+i, so that the terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

Alternatively, the channel assessment unit includes a first setting subunit, which is configured to set a starting point of the channel assessment time at a starting point of any one subframe after the subframe n and before the subframe n+i.

Alternatively, the channel assessment unit includes a second setting subunit, which is configured to set the starting point of the channel assessment time at a starting point of a designated symbol within any one subframe after the subframe n and before the subframe n+i.

Among them, the designated symbol includes a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, and a thirteenth symbol within the any one subframe.

Alternatively, the starting point of the channel assessment time may be set at a starting point of any one subframe, that is, the first symbol within any one subframe; or uplink CCA may be started when a last subframe transmitted at a downlink (that is, a downlink ending partial subframe) ends. Because when a structure of a downlink pilot time slot (DwPTS) is multiplexed by the ending partial subframe, the third symbol, the sixth symbol, the ninth symbol, the tenth symbol, the eleventh symbol and the twelfth symbols may be occupied, the starting point of the channel assessment time may be set at a starting point of the fourth symbol, the seventh symbol, the tenth symbol, the eleventh symbol or the thirteenth symbol of any one subframe.

Alternatively, the apparatus further includes a first processing unit or second processing unit;

where the first processing unit is configured to: transmit an initial signal or a reservation signal if it is detected that the uplink channel is in a clear state before the starting point of the subframe n+i, and occupy the uplink channel at the starting point of the subframe n+i to transmit the uplink data;

the second processing unit is configured to: perform a self-deferral process if it is detected that the uplink channel is in the clear state before the starting point of the subframe n+i, and after the self-deferral process is performed and before the starting point of the subframe n+i, perform a channel assessment process for a predetermined duration; and occupy the uplink channel to transmit the uplink data when it is detected that the uplink channel is in the clear state in the channel assessment process for the predetermined duration, and not transmit the uplink data when it is detected that the uplink channel is in a busy state in the channel assessment process for the predetermined duration.

Alternatively, the predetermined duration is 16 μs+M×9 μs, where M is equal to 1 or 2.

Alternatively, the apparatus further includes:

a first reception unit, which is configured to receive radio resource control (RRC) signaling for indicating a starting point of the channel assessment time transmitted by the base station, so as to determine a starting point of the channel assessment time according to the RRC signaling; or a second reception unit, which is configured to receive multiple configuration manners of the starting point of the channel assessment time and identification codes corresponding to the configuration manners, which are transmitted by the base station through the RRC signaling, and receive a target identification code transmitted by the base station through downlink control information (DCI) signaling, so as to determine the starting point of the channel assessment time according to a configuration manner corresponding to the target identification code; or a third reception unit, which is configured to receive the target identification code transmitted by the base station through the DCI signaling, so as to determine the configuration manner corresponding to the target identification code according to a correspondence between identification codes and the configuration manners of the starting point of the channel assessment time, which is stored in the terminal, and determine the starting point of the channel assessment time according to the configuration manner corresponding to the target identification code; or a listening unit, which is configured to listen to signaling for indicating that the subframe ends transmitted by the base station, so as to determine the starting point of the channel assessment time according to a last subframe of downlink transmission and the number of symbols occupied by the last subframe, which are indicated by the signaling indicating that the subframe ends.

In this technical solution, the starting point of the channel assessment time of the terminal may be set by the base station through the signaling, that is, the channel assessment time of the terminal is controlled by the base station, and then the base station may ensure that the probability of preempting the channel by the terminal is maximized while making the terminal save power by setting the channel assessment time of the terminal.

Alternatively, the value of i is 1, 2, 3, or 4.

Alternatively, the apparatus further includes:

a data transmission unit, which is configured to indicate that the time starting point for transmitting the uplink data is the starting point of any one subframe and lengths of fourteen symbols or lengths of thirteen symbols of the any one subframe are continuously occupied, when the any one subframe occupies the uplink channel to transmit the uplink data.

According to a fourth aspect, the present disclosure further proposes a channel assessment apparatus when a LTE system operates in an unlicensed band, including:

a transmission unit, which is configured to transmit an uplink scheduling instruction to a terminal in a subframe n to instruct the terminal to transmit uplink data in a subframe n+i; and a notification unit, which is configured to notify a starting point of channel assessment time to the terminal, so that the terminal sets the channel assessment time in a subframe after the subframe n and before the subframe n+i.

In this technical solution, the base station notifies the terminal of the starting point of the channel assessment time, so that the terminal can specify a starting point of a load-based CCA time in scheduling-based uplink transmission, that is, the channel assessment time of the terminal is limited by the base station, and thus the problem of higher power consumption caused by blindly performing the CCA by the terminal can be avoided, and the probability of preempting a channel by the terminal can be increased.

Alternatively, the notification unit is configured to:

transmit a radio resource control (RRC) signaling for indicating the starting point of the channel assessment time to the terminal, so that the terminal determines the starting point of the channel assessment time according to the RRC signaling; or transmit multiple configuration manners of the starting point of the channel assessment time and identification codes corresponding to the configuration manners to the terminal through the RRC signaling, and transmit a target identification code to the terminal through a DCI signaling, so that the terminal determines the starting point of the channel assessment time according to a configuration manner corresponding to the target identification code; or transmit the target identification code to the terminal through the DCI signaling, so that the terminal determines the configuration manner corresponding to the target identification code according to a correspondence between identification codes and the configuration manners of the starting point of the channel assessment time, which is stored in the terminal, and determines the starting point of the channel assessment time according to the configuration manner corresponding to the target identification code; or transmit signaling for indicating that the subframe ends to the terminal, wherein the signaling for indicating that the subframe ends is configured to indicate a last subframe of downlink transmission and the number of symbols occupied by the last subframe, so that the terminal determines the starting point of the channel assessment time according to the last subframe and the number of symbols occupied by the last subframe.

According to a fifth aspect, the present disclosure further provides a terminal, including the channel assessment apparatus when a LTE system operates in an unlicensed band as described above in the third aspect.

According to a sixth aspect, the present disclosure further proposes a base station, including the channel assessment apparatus when a LTE system operates in an unlicensed band as described above in the fourth aspect.

According to a seventh aspect, the present disclosure further provides a non-transitory computer-readable storage medium which is configured in a terminal side and stores computer-executable instructions, where the computer-executable instructions may be configured to instruct the channel assessment method when a LTE system operates in an unlicensed band as described above in the first aspect.

According to an eighth aspect, the present disclosure further provides a non-transitory computer-readable storage medium which is configured in a base station side and stores computer-executable instructions, where the computer-executable instructions may be configured to instruct the channel assessment method when a LTE system operates in an unlicensed band as described above in the second aspect.

Through the above technical solution, the terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

DETAILED DESCRIPTION OF EMBODIMENT

In order to make the objects, features, and advantages of the present disclosure be more clearly understood, the present disclosure will be described below in conjunction with accompanying drawings and alternative embodiments. It should be noted that embodiments of the present disclosure and features in the embodiments may be combined with each other without conflict.

Many details will be set forth in the following description in order to provide a thorough understanding of the present disclosure. However, the present disclosure may also be implemented in other manners different from those described herein. Accordingly, a protection scope of the present disclosure is not limited to specific embodiments disclosed below.

Figure 1:
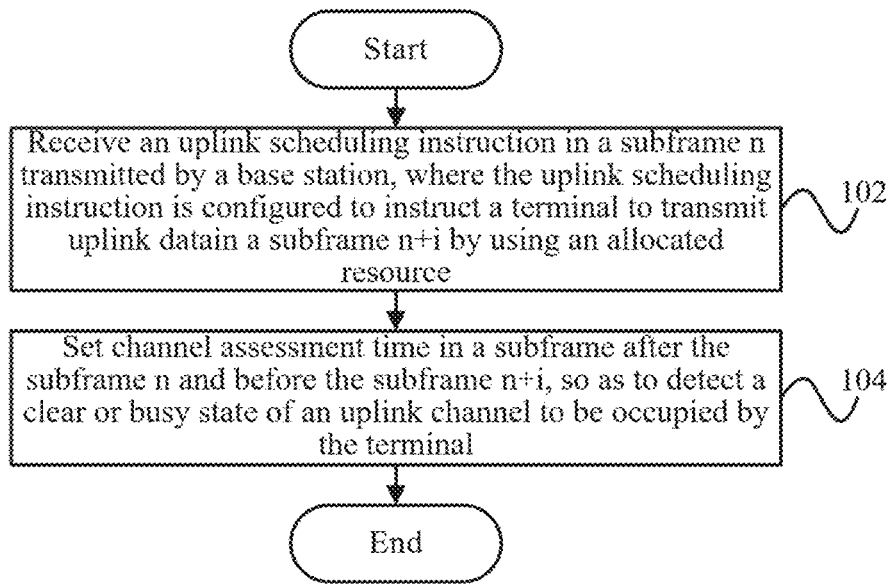
FIG. 1 shows a schematic flow diagram of a channel assessment method when a LTE system operates in an unlicensed band according to a first embodiment of the present disclosure.

FIG. 1 shows a schematic flow diagram of a channel assessment method when a LTE system operates in an unlicensed band according to a first embodiment of the present disclosure.

As shown in FIG. 1, a channel assessment method when a LTE system operates in an unlicensed band according to a first embodiment of the present disclosure includes: step 102-step 104.

In step 102, a terminal receives an uplink scheduling instruction transmitted by a base station in a subframe n, where the uplink scheduling instruction is configured to instruct a terminal to transmit uplink data in a subframe n+i by using an allocated resource.

In step 104, the terminal sets channel assessment time in a subframe after the subframe n and before the subframe n+i, so as to detect a clear or busy state of an uplink channel to be occupied by the terminal.

In this technical solution, the terminal sets the channel assessment time in the subframe after the subframe n and before the subframe n+i, so that the terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

In the above technical solution, alternatively, that the terminal sets the channel assessment time in a subframe after the subframe n and before the subframe n+i includes: the terminal sets the starting point of the channel assessment time at a starting point of any one subframe after the subframe n and before the subframe n+i.

In any one technical solution, alternatively, that the terminal sets channel assessment time in a subframe after the subframe n and before the subframe n+i includes:

the terminal sets the starting point of the channel assessment time at a starting point of a designated symbol within any one subframe after the subframe n and before the subframe n+i.

The designated symbol may include a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, or a thirteenth symbol within the any one subframe.

Alternatively, the terminal may set the starting point of the channel assessment time at a starting point of any one subframe, that is, the first symbol within the any one subframe; or uplink CCA may be started when a downlink ending partial subframe ends. Because when a structure of a downlink pilot time slot (DwPTS) is multiplexed by the ending partial subframe, the terminal may occupy the third symbol, the sixth symbol, the ninth symbol, the tenth symbol, the eleventh symbol and the twelfth symbols of the any one subframe, the terminal may set the starting point of the channel assessment time at a starting point of the fourth symbol, the seventh symbol, the tenth symbol, the eleventh symbol or the thirteenth symbol of the any one subframe.

In any one technical solution, alternatively, the method may further include:

If it is detected that the uplink channel is in a clear state before the starting point of the subframe n+i, the terminal transmits an initial signal or a reservation signal, and occupies the uplink channel at the starting point of the subframe n+i to transmit the uplink data; or if it is detected that the uplink channel is in the clear state before the starting point of the subframe n+i, the terminal performs a self-deferral process, and after the self-deferral process is performed and before the starting point of the subframe n+i, performs a channel assessment process for a predetermined duration;

when it is detected that the uplink channel is in the clear state in the channel assessment process for the predetermined duration, the terminal occupies the uplink channel to transmit the uplink data; and when it is detected that the uplink channel is in a busy state in the channel assessment process for the predetermined duration, the terminal does not transmit the uplink data.

Alternatively, the predetermined duration is 16 μs+M×9 μs, where M is equal to 1 or 2.

In any one technical solution, alternatively, the method may also include:

radio resource control (RRC) signaling for indicating a starting point of the channel assessment time transmitted by the base station, so as to determine a starting point of the channel assessment time according to the RRC signaling; or multiple configuration manners of the starting point of the channel assessment time and identification codes corresponding to the configuration manners, which are transmitted by the base station through the RRC signaling, are received, and a target identification code transmitted by the base station through a downlink control information (DCI) signaling is received, so as to determine the starting point of the channel assessment time according to the configuration manner corresponding to the target identification code; or the target identification code transmitted by the base station through the DCI signaling is received, and the configuration manner corresponding to the target identification code is determined according to a correspondence between identification codes and the configuration manners of the starting point of the channel assessment time, which is stored in the terminal, and the starting point of the channel assessment time is determined according to the configuration manner corresponding to the target identification code; or a signaling, for indicating that the subframe ends, transmitted by the base station is listened, so as to determine the starting point of the channel assessment time according to a last subframe of downlink transmission and the number of symbols occupied by the last subframe, which are indicated by the signaling for indicating that the subframe ends.

In this technical solution, the starting point of the channel assessment time of the terminal can be set by the base station through the signaling, that is, the channel assessment time of the terminal is controlled by the base station, and then the base station can ensure that the probability of preempting the channel by the terminal is maximized while making the terminal save power by setting the channel assessment time of the terminal.

In any one technical solution, alternatively, the value of i is 1, 2, 3, or 4.

In any one technical solution, alternatively, the method may also include the following steps.

When any one subframe occupies the uplink channel to transmit the uplink data, it is indicated that the time starting point for transmitting the uplink data is the starting point of any one subframe and that lengths of fourteen symbols or lengths of thirteen symbols of the any one subframe are continuously occupied.

Figure 2:
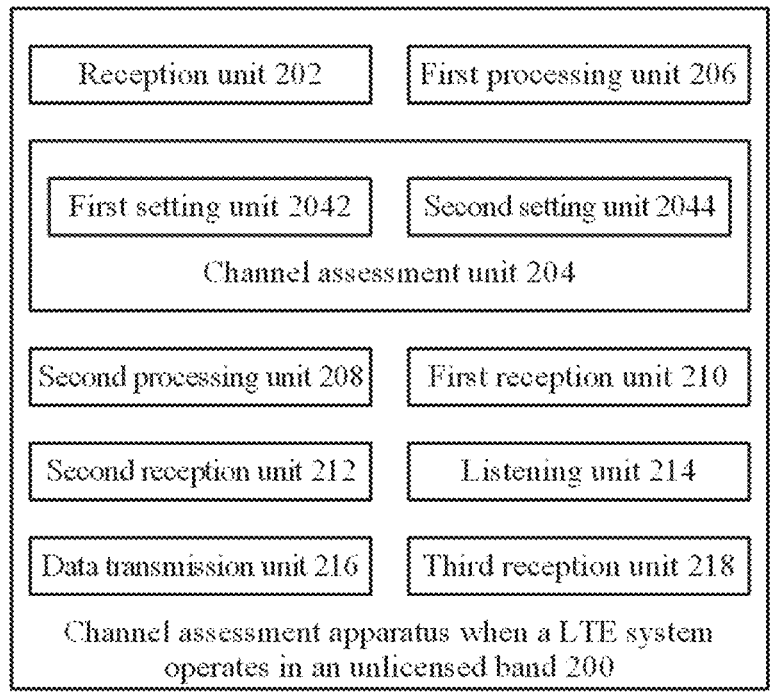
FIG. 2 shows a schematic block diagram showing a channel assessment apparatus when a LTE system operates in an unlicensed band according to a first embodiment of the present disclosure.

FIG. 2 shows a schematic block diagram showing a channel assessment apparatus when a LTE system operates in an unlicensed band according to a first embodiment of the present disclosure.

As shown in FIG. 2, a channel assessment apparatus 200 when a LTE system operates in an unlicensed band according to a first embodiment of the present disclosure includes a reception unit 202 and a channel assessment unit 204.

Where the reception unit 202 is configured to receive an uplink scheduling instruction transmitted by a base station in a subframe n, where the uplink scheduling instruction is used to instruct a terminal to transmit uplink data in a subframe n+i by using an allocated resource.

The channel assessment unit 204 is configured to set channel assessment time in a subframe after the subframe n and before the subframe n+i, so as to detect a clear or busy state of an uplink channel to be occupied by the terminal.

In this technical solution, the channel assessment time is set in the subframe after the subframe n and before the subframe n+i, so that the terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

In the above technical solution, alternatively, the channel assessment unit 204 may include a first setting subunit 2042, which is configured to set the starting point of the channel assessment time at a starting point of any one subframe after the subframe n and before the subframe n+i.

In any one technical solution, alternatively, the channel assessment unit 204 includes a second setting subunit 2044, which is configured to set the starting point of the channel assessment time at a starting point of a designated symbol within any one subframe after the subframe n and before the subframe n+i.

Herein the designated symbol includes a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, or a thirteenth symbol within the any one subframe.

Alternatively, the starting point of the channel assessment time may be set at a starting point of any one subframe, that is, the first symbol within any one subframe; or uplink CCA may be started when a downlink ending partial subframe ends. Because when a structure of a downlink pilot time slot (DwPTS) is multiplexed by the ending partial subframe, the third symbol, the sixth symbol, the ninth symbol, the tenth symbol, the eleventh symbol and the twelfth symbols of the any one subframe may be occupied, the terminal may set the starting point of the channel assessment time at a starting point of the fourth symbol, the seventh symbol, the tenth symbol, the eleventh symbol or the thirteenth symbol of the any one subframe.

In any one technical solution, alternatively, the apparatus also includes a first processing unit 206 or second processing unit 208.

The first processing unit 206 is configured to: if the channel assessment unit 204 detects that the uplink channel is in a clear state before the starting point of the subframe n+i, transmit an initial signal or a reservation signal, and occupy the uplink channel at the starting point of the subframe n+i to transmit the uplink data.

The second processing unit 208 is configured to: if the channel assessment unit 204 detects that the uplink channel is in the clear state before the starting point of the subframe n+i, perform a self-deferral process, and after the self-deferral process is performed and before the starting point of the subframe n+i, perform a channel assessment process for a predetermined duration.

The second processing unit 208 is configured to when it is detected that the uplink channel is in the clear state in the channel assessment process for the predetermined duration, occupy the uplink channel to transmit the uplink data; and when it is detected that the uplink channel is in a busy state in the channel assessment process for the predetermined duration, not transmit the uplink data.

Alternatively, the predetermined duration is 16 μs+M×9 μs, where M is equal to 1 or 2.

In any one technical solution, alternatively, the apparatus may further include:

a first reception unit 210, which is configured to receive radio resource control (RRC) protocol signaling, which is transmitted by the base station, to indicate a starting point of the channel assessment time, so as to determine a starting point of the channel assessment time according to the RRC signaling; or a second reception unit 212, which is configured to receive multiple configuration manners of the starting point of the channel assessment time and identification codes corresponding to the configuration manners, which are transmitted by the base station through the RRC signaling, and receive a target identification code transmitted by the base station through downlink control information (DCI) signaling, so as to determine the starting point of the channel assessment time according to a configuration manner corresponding to the target identification code; or a third reception unit 218, which is configured to receive the target identification code transmitted by the base station through the DCI signaling, so as to determine the configuration manner corresponding to the target identification code according to a correspondence between identification codes and the configuration manners of the starting point of the channel assessment time, which is stored in the terminal, and determine the starting point of the channel assessment time according to the configuration manner corresponding to the target identification code; or a listening unit 214, which is configured to listen to signaling for indicating that the subframe ends transmitted by the base station, so as to determine the starting point of the channel assessment time according to a last subframe of downlink transmission and the number of symbols occupied by the last subframe, which are indicated by the signaling indicating that the subframe ends. In this technical solution, the starting point of the channel assessment time of the terminal can be set by the base station through the signaling, that is, the channel assessment time of the terminal is controlled by the base station, and then the base station can ensure that the probability of preempting the channel by the terminal is maximized while making the terminal save power by setting the channel assessment time of the terminal.

In any one technical solution, alternatively, the value of i is 1, 2, 3, or 4.

In any one technical solution, alternatively, the apparatus may also include a data transmission unit 216.

The data transmission unit 216 is configured to: when any one subframe occupies the uplink channel to transmit the uplink data, indicate that the time starting point for transmitting the uplink data is the starting point of any one subframe and lengths of fourteen symbols or lengths of thirteen symbols of any one subframe are continuously occupied.

Figure 3:
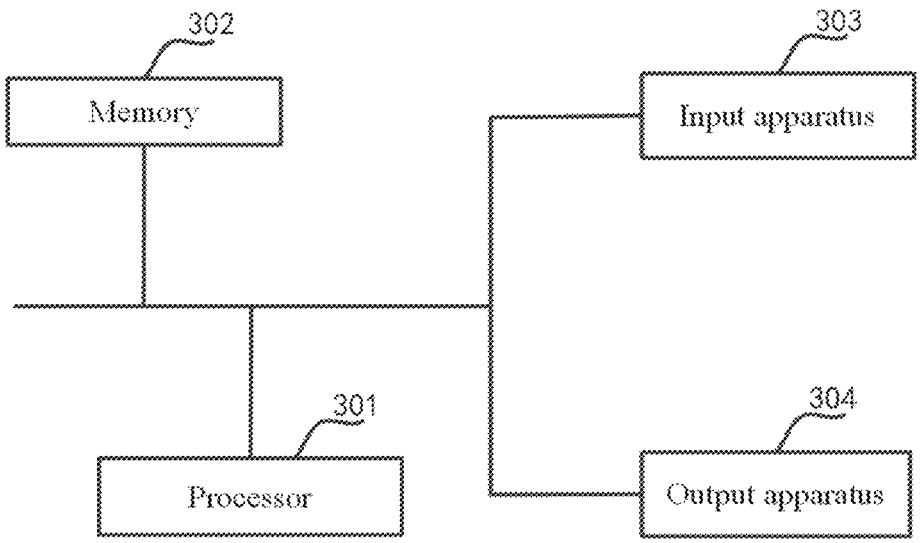
FIG. 3 shows a schematic block diagram showing a hardware structure of a terminal according to an embodiment of the present disclosure.

FIG. 3 shows a schematic block diagram showing a hardware structure of a terminal according to an embodiment of the present disclosure.

As shown in FIG. 3, a terminal 300 according to an embodiment of the present disclosure may include: one or more processors 301, where one processor 301 is taken as an example in FIG. 3; a memory 302.

The terminal may also include an input apparatus 303 and an output apparatus 304.

The processor 301, the memory 302, the input apparatus 303, and the output apparatus 304 in the terminal may be connected via a bus or other manners. In FIG. 3, the connection via the bus is taken as an example.

The memory 302 as a non-transitory computer-readable storage medium may be configured for storing software programs, computer-executable programs, and modules, for example, program instructions/modules (for example, a reception unit 202 and a channel assessment unit 204 as shown in FIG. 2) corresponding to the channel assessment method when a LTE system configured in a terminal side operates in an unlicensed band in the embodiment of the present disclosure. The processor 301 is configured to perform various functional applications and data processing of the server by running the software programs, the instructions, and the modules stored in the memory 302, that is, implement the channel assessment method when the LTE system configured on the terminal side operates in the unlicensed band in the above method embodiment.

The memory 302 may include a storage program area and a storage data area, where the storage program area may store an operating system, and at least one application required for the function; the storage data area may store data created according to the use of a terminal device, and the like. In addition, the memory 302 may include a high-speed random access memory, and may also include a non-transitory memory, such as at least one disk storage device, a flash memory device, or other non-volatile solid-state storage devices. In some embodiments, the memory 302 may optionally include memories remotely located relative to the processor 301, and these remotely located memories may be connected to the terminal device over a network. Examples of such networks include, but are not limited to, the Internet, intranets, local area networks, mobile communications networks, and combinations thereof.

The input apparatus 303 may be configured to receive input numeric or character information and generate key signal inputs related to user's settings and function control of the terminal. The output apparatus 304 may include a display device such as a display screen.

The one or more modules are stored in the memory 302, and when being executed by the one or more processors 301, perform the channel assessment method when the LTE system configured on the terminal side operates in the unlicensed band in the above method embodiment.

Figure 4:
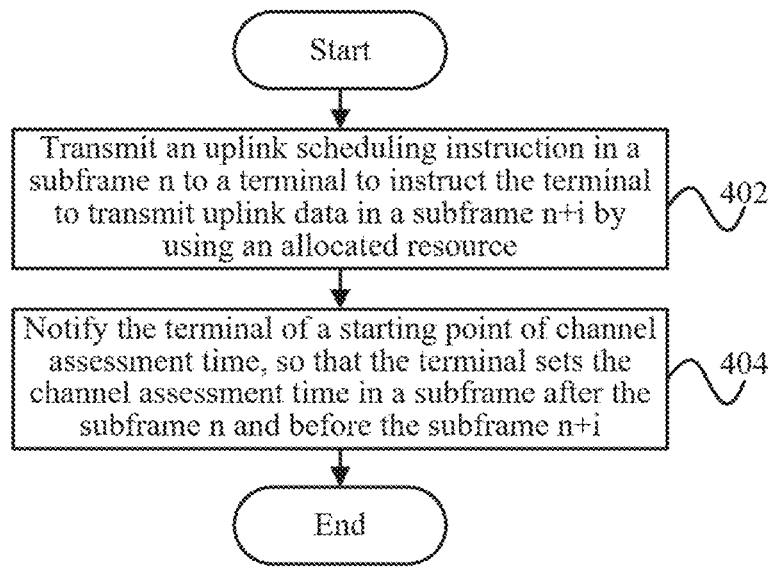
FIG. 4 shows a schematic flow diagram of a channel assessment method when a LTE system operates in an unlicensed band according to a second embodiment of the present disclosure.

FIG. 4 shows a schematic flow diagram of a channel assessment method when a LTE system operates in an unlicensed band according to a second embodiment of the present disclosure.

As shown in FIG. 4, a channel assessment method when a LTE system operates in an unlicensed band according to a second embodiment of the present disclosure includes: step 402-step 404.

In step 402, a base station transmits an uplink scheduling instruction in a subframe n to a terminal to instruct the terminal to transmit uplink data in a subframe n+i by using an allocated resource.

In step 404, the base station notifies the terminal of a starting point of channel assessment time, so that the terminal sets the channel assessment time in a subframe after the subframe n and before the subframe n+i.

In this technical solution, the base station notifies the terminal of the starting point of the channel assessment time, so that the terminal can specify a starting point of a load-based CCA time in scheduling-based uplink transmission, that is, the channel assessment time of the terminal is limited by the base station, and thus the problem of higher power consumption caused by blindly performing the CCA by the terminal can be avoided, and the probability of preempting a channel by the terminal can be increased.

In the above technical solution, alternatively, that the base station notifies the terminal of a starting point of channel assessment time includes:

the base station transmits a RRC signaling for indicating the starting point of the channel assessment time to the terminal, so that the terminal determines the starting point of the channel assessment time according to the RRC signaling; or the base station transmits multiple configuration manners of the starting point of the channel assessment time as well as identification codes corresponding to the configuration manners to the terminal through the RRC signaling, and transmits a target identification code to the terminal through a DCI signaling, so that the terminal determines the starting point of the channel assessment time according to the configuration manner corresponding to the target identification code; or the base station transmits the target identification code to the terminal through the DCI signaling, so that the terminal determines the configuration manner corresponding to the target identification code according to a correspondence between identification codes and the configuration manners of the starting point of the channel assessment time, which is stored in the terminal, and determines the starting point of the channel assessment time according to the configuration manner corresponding to the target identification code; or the base station transmits signaling for indicating that the subframe ends to the terminal, where the signaling for indicating that the subframe ends is used to indicate the a last subframe of downlink transmission and the number of symbols occupied by the last subframe, so that the terminal determines the starting point of the channel assessment time according to the last subframe and the number of symbols occupied by the last subframe.

Figure 5:
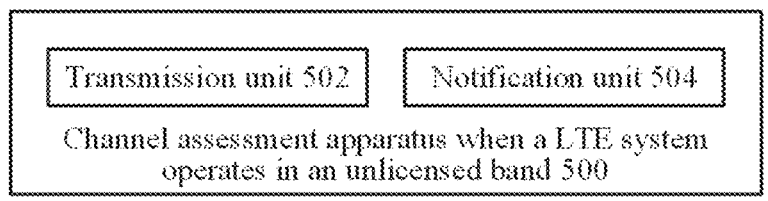
FIG. 5 is a schematic block diagram showing a channel assessment apparatus when a LTE system operates in an unlicensed band according to a second embodiment of the present disclosure.

FIG. 5 is a schematic block diagram showing a channel assessment apparatus when a LTE system operates in an unlicensed band according to a second embodiment of the present disclosure.

As shown in FIG. 5, a channel assessment apparatus 500 when a LTE system operates in an unlicensed band according to a second embodiment of the present disclosure includes a transmission unit 502 and a notification unit 504.

Where the transmission unit 502 is configured to transmit an uplink scheduling instruction in a subframe n to a terminal to instruct the terminal to transmit uplink data in a subframe n+i by using an allocated resource.

The notification unit 504 is configured to notify the terminal of a starting point of channel assessment time, so that the terminal sets the channel assessment time in a subframe after the subframe n and before the subframe n+i.

In this technical solution, the base station notifies the terminal of the starting point of the channel assessment time, so that the terminal can specify a starting point of a load-based CCA time in scheduling-based uplink transmission, that is, the channel assessment time of the terminal is limited by the base station, and thus the problem of higher power consumption caused by blindly performing the CCA by the terminal can be avoided, and the probability of preempting a channel by the terminal can be increased.

In the above technical solution, alternatively, the notification unit is configured to:

transmit a RRC signaling for indicating the starting point of the channel assessment time to the terminal, so that the terminal determines the starting point of the channel assessment time according to the RRC signaling; or transmit multiple configuration manners of the starting point of the channel assessment time and identification codes corresponding to the configuration manners to the terminal through the RRC signaling, and transmit a target identification code to the terminal through a DCI signaling, so that the terminal determines the starting point of the channel assessment time according to a configuration manner corresponding to the target identification code; or transmit the target identification code to the terminal through the DCI signaling, so that the terminal determines the configuration manner corresponding to the target identification code according to a correspondence between identification codes and the configuration manners of the starting point of the channel assessment time, which is stored in the terminal, and determines the starting point of the channel assessment time according to the configuration manner corresponding to the target identification code; or transmit signaling for indicating that the subframe ends to the terminal, where the signaling for indicating that the subframe ends is configured to indicate a last subframe of downlink transmission and the number of symbols occupied by the last subframe, so that the terminal determines the starting point of the channel assessment time according to the last subframe and the number of symbols occupied by the last subframe.

Figure 6:
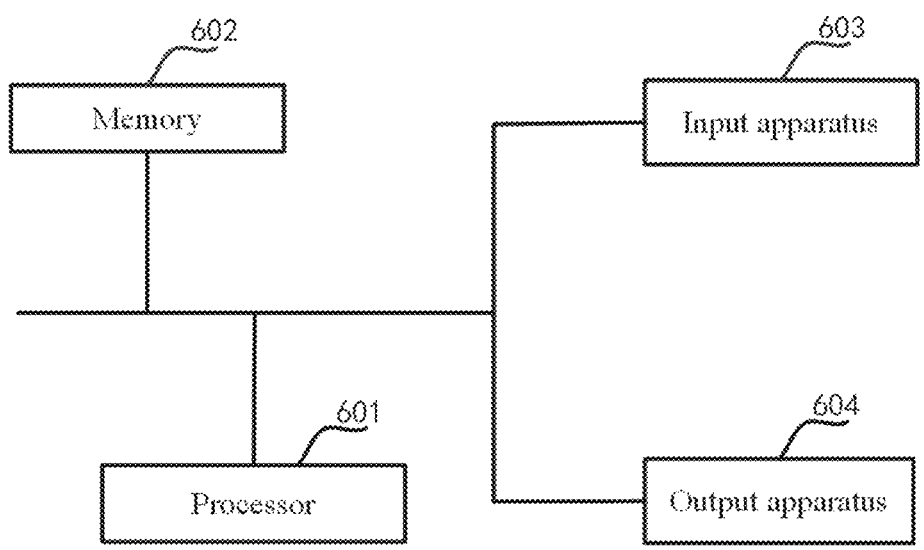
FIG. 6 shows a schematic block diagram showing a hardware structure of a base station according to an embodiment of the present disclosure.

FIG. 6 shows a schematic block diagram showing a hardware structure of a base station according to an embodiment of the present disclosure.

As shown in FIG. 6, a base station 600 according to an embodiment of the present disclosure may include: one or more processors 601, where one processor 601 is taken as an example in FIG. 6; a memory 602.

The base station may also include an input apparatus 603 and an output apparatus 604.

The processor 601, the memory 602, the input apparatus 603, and the output apparatus 604 in the base station may be connected via a bus or other manners. In FIG. 6, the connection through the bus is taken as an example.

The memory 602 as a non-transitory computer-readable storage medium may be configured for storing software programs, computer-executable programs, and modules, for example, program instructions/modules (for example, a transmission unit 502 and a notification unit 504 as shown in FIG. 5) corresponding to the channel assessment method when a LTE system configured in a base station side operates in an unlicensed band in the embodiment of the present disclosure. The processor 601 is configured to perform various functional applications and data processing of the server by running the software programs, the instructions, and the modules stored in the memory 602, that is, implements the channel assessment method when the LTE system configured on the base station side operates in the unlicensed band in the above method embodiment.

The memory 602 may include a storage program area and a storage data area, where the storage program area may store an operating system, and at least one application required for the function; the storage data area may store data created according to the use of a terminal device, and the like. In addition, the memory 602 may include a high-speed random access memory, and may also include a non-transitory memory, such as at least one disk storage device, a flash memory device, or other non-volatile solid-state storage devices. In some embodiments, the memory 602 may optionally include memories remotely located relative to the processor 601, and these remotely located memories may be connected to the terminal device over a network. Examples of such networks include, but are not limited to, the Internet, intranets, local area networks, mobile communications networks, and combinations thereof.

The input apparatus 603 may be configured to receive input numeric or character information and generate key signal inputs related to user's settings and function control of the terminal. The output apparatus 604 may include a display device such as a display screen.

The one or more modules are stored in the memory 602, and when being executed by the one or more processors 601, perform the channel assessment method when the LTE system configured on the base station side operates in the unlicensed band in the above method embodiment.

In summary, a technical solution of the present disclosure is mainly directed to a configuration of a starting point of a CCA time, which is regarding a physical uplink shared channel (PUSCH) of scheduled UE received a UL grant, and a solution of the proposed configuration is as follows.

I. The scheduled UE receives the UL grant in a subframe n, and a starting point of an uplink CCA time is located after a subframe n and before a starting boundary of a subframe n+i. That is, the starting point of the uplink CCA time is set after an ending boundary of the subframe n and before the starting boundary of the subframe n+i, where the i may be 1, 2, 3, or 4.

Figure 7:
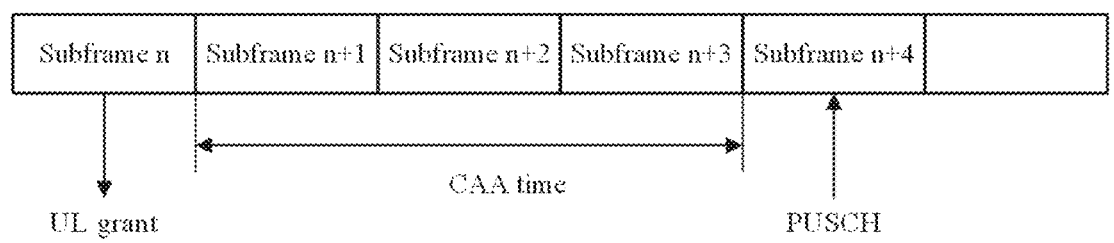
FIG. 7 shows a schematic diagram showing a CCA setting position according to an embodiment of the present disclosure.

As shown in FIG. 7, if the i is equal to 4, the time of the CCA may be set within any one subframe after the subframe n and before a subframe n+4. Here are a few alternative examples.

1. The starting point of the CCA is configured at time immediately after the UL grant is received, for instance, the CCA is started at a starting boundary of a subframe n+1 when the subframe n receives the UL grant.

2. The CCA is started at a starting boundary of a subframe n+2.

3. The CCA is started at a starting boundary of a subframe n+3. This situation represents that a load-based CCA process is of up to 1 ms.

4. The CCA is started at a starting boundary of a $m^{th}$ symbol of the subframe n+1 or the subframe n+2 or the subframe n+3, where m is 1, 4, 7, 10, 11, 12, and 13 (it should be noted that the number of the $m^{th}$ symbol in the subframe is m−1), m of 1 means that it starts from a starting point of the subframe, and other values of m refer to the number of symbols of multiple structures of a DwPTS multiplexed by an ending partial subframe, that is, the uplink CCA may be started when a downlink ending partial subframe ends. Alternatively, because when the structure of the downlink pilot time slot (DwPTS) is multiplexed by the ending partial subframe, the third symbol, the sixth symbol, the ninth symbol, the tenth symbol, the eleventh symbol and the twelfth symbols within any one subframe may be occupied, the starting point of the channel assessment time may be set at a starting point of the fourth symbol, the seventh symbol, the tenth symbol, the eleventh symbol or the thirteenth symbol of the any one subframe.

II. If it is detected that a channel is in a clear state before the starting boundary of the subframe n+i, an initial signal or a reservation signal is transmitted, and a PUSCH is started to be transmitted at the starting point of the n+i; or if it is detected that the channel is in the clear state before the starting boundary of the subframe n+i, a self-deferral process is performed, and then a CCA up to 16 μs+M×9 μs is performed before the starting boundary of the subframe n+i, where M is equal to 1 or 2, and if it is detected that the channel is in the clear state, uplink data is transmitted, and if it is detected that the channel is busy, the uplink data is not transmitted.

III. A configuration signaling of a starting point of a CCA

1. A configuration through a RRC signaling: this case is applicable to a semi-static configuration of a starting point of a CCA time, for instance, is fixed at the beginning of a symbol of a subframe n+1 or n+2 or n+3.

2. A RRC signaling and a DCI signaling: this case is applicable to a dynamic configuration of a starting point of a CCA time. For instance, it is not determined that it starts from which symbol of which subframe, there is a need for the DCI signaling to indicate it. Alternatively, the RRC signaling gives multiple possible configurations and bit sequences of DCI, corresponding to the configurations, and the DCI signaling gives a bit sequence. After the user receives the RRC signaling and the DCI signaling, that is, the configuration of the starting point of the CCA time is known. In addition, it should be noted that if the starting point of the CCA time is configured at a certain symbol of the subframe n+3, a DCI signaling needs to be transmitted in the subframe n+2, and the subframe n+3 may need to transmit the same DCI signaling again. Such a manner of multiple transmissions may ensure that the UE receives the DCI signaling and avoids the problem that some UEs do not receive the DCI signaling.

As one embodiment rather than a limitation, various possible configurations and bit sequences of the DCI signaling, corresponding to the configurations, which included in the RRC signaling, may be as shown in Table 1:

TABLE 1

| Bit sequence of DCI | Configuration of starting point of CCA |
|---|---|
| 0000 Configuration 1 | Start at a first symbol of the next subframe |
| 0001 Configuration 2 | Start at a fourth symbol of the next subframe |
| 0010 Configuration 3 | Start at a seventh symbol of the next subframe |
| 0011 Configuration 4 | Start at a tenth symbol of the next subframe |
| 0100 Configuration 5 | Start at an eleventh symbol of the next subframe starts |
| 0101 Configuration 6 | Start at a twelfth symbol of the next subframe |
| 0110 Configuration 7 | Start at a thirteenth symbol of the next subframe |
| 0111 Configuration 8 | Start at a first symbol of a current subframe |
| 1000 Configuration 9 | Start at a fourth symbol of a current subframe |
| 1001 Configuration 10 | Start at a seventh symbol of a current subframe |
| 1010 Configuration 11 | Start at a tenth symbol of a current subframe |
| 1011 Configuration 12 | Start at an eleventh symbol of a current subframe |

TABLE 1-continued

| Bit sequence of DCI | Configuration of starting point of CCA |
|---|---|
| 1100 Configuration 13 | Start at a twelfth symbol of a current subframe |
| 1101 Configuration 14 | Start at a thirteenth symbol of a current subframe |
| 1110 | Reserved |
| 1111 | Reserved |

As shown in Table 1, the DCI signaling transmits a bit sequence 0011 in a subframe n+2, which indicates that UE is informed to start a CCA at the 10th symbol of the subframe n+3. The DCI signaling may be transmitted on an unlicensed spectrum by using a PDCCH (Physical Downlink Control Channel) common signaling, particularly, using a DCI format 1C or 1A.

3. A correspondence between multiple configurations, which are transmitted by the RRC signaling, of the starting point and corresponding identification codes of DCI in the foregoing 2 may be directly stored in a chip of the terminal instead of being transmitted by using the RRC signaling. Only the DCI signaling needs to be transmitted to the terminal to indicate a target identification code, so that the terminal may determine the configuration manner corresponding to the target identification code according to a correspondence (which may be a table) between identification codes and the configuration manners of the starting point of the channel assessment time, which is stored in the terminal, and determine the starting point of the channel assessment time according to the configuration manner corresponding to the target identification code.

4. An existing signaling used to indicate an ending partial subframe is directly multiplexed, and no additional signaling indication is needed. Then, it is necessary to define a behavior of the scheduled UE: after receiving the UL grant, the scheduled UE shall listen to a signaling, which is transmitted by the base station, to indicate a structure of the ending partial subframe, the signaling is transmitted by the PDCCH common signaling, that is, it indicates which subframe is the last subframe transmitted by a downlink, and also indicates which DwPTS structure is used by the subframe, i.e. how many symbols are occupied. Then, the starting point of the CCA time of the UE starts at the beginning of the next symbol after the number of symbols occupied by the ending partial subframe ends, for instance, the ending partial subframe occupies 3 symbols, and the starting point of the CCA time starts from the fourth symbol.

The above technical solution of the present disclosure proposes a method for configuring a starting point of uplink CCA time and relevant signaling instructions to explicitly inform the scheduled UE to detect relevant signalings after receiving the UL grant, obtain the configuration information about a time starting position of the CCA and enable the CCA according to the configuration information, so that the time of performing uplink channel assessment by the UE is controlled by the base station, the power saving of the terminal is achieved and the probability of preempting the channel by the terminal is maximized.

An embodiment of the present disclosure provides a non-transitory computer-readable storage medium which is configured in a terminal side and is configured to store computer-executable instructions, where these computer-executable instructions are configured to perform the channel assessment method when a LTE system configured in a terminal side operates in an unlicensed band according to any one of the foregoing items.

An embodiment of the present disclosure provides a non-transitory computer-readable storage medium which is configured in a base station side and is configured to store computer-executable instructions, where these computer-executable instructions are configured to perform the channel assessment method when a LTE system configured in a base station side operates in an unlicensed band according to any one of the foregoing items.

The technical solution of the present disclosure has been described in detail above with reference to the accompanying drawings. The present disclosure proposes a novel channel assessment solution when a LTE system operates in an unlicensed band, so that a terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

The foregoing descriptions are merely exemplary embodiments of the present disclosure and are not intended to limit the present disclosure. For those skilled in the art, the present disclosure may have various changes and modifications. Any modifications, equivalent substitutions, or improvements made within the spirit and principle of the present disclosure shall fall within the protective scope of the present disclosure.

INDUSTRIAL APPLICABILITY

A technical solution of the present disclosure ensures that a terminal can specify a starting point of a load-based CCA time in scheduling-based uplink transmission, and thus the problem of higher power consumption caused by blindly performing the CCA by the terminal can be avoided, and the probability of preempting a channel by the terminal can be increased.

The invention claimed is:

1. A channel assessment method when a long term evolution (LTE) system operates in an unlicensed band, applied in a terminal, comprising:
    receiving an uplink scheduling instruction transmitted by a base station in a subframe n, wherein the uplink scheduling instruction is configured to instruct the terminal to transmit uplink data in a subframe n+i by using an allocated resource; and
    setting channel assessment time in a subframe after the subframe n and before the subframe n+i, so as to detect a clear or busy state of an uplink channel to be occupied by the terminal; and
    wherein the method further comprises:
    receiving multiple configuration manners of the starting point of the channel assessment time and identification codes corresponding to the configuration manners, which are transmitted by the base station through radio resource control (RRC) signaling, and receiving a target identification code transmitted by the base station through downlink control information (DCI) signaling, so as to determine the starting point of the channel assessment time according to a configuration manner corresponding to the target identification code; or
    receiving the target identification code transmitted by the base station through downlink control information (DCI) signaling, so as to determine the configuration manner corresponding to the target identification code according to a correspondence between identification codes and the configuration manners of the starting point of the channel assessment time, which is stored in the terminal, and determine the starting point of the channel assessment time according to the configuration manner corresponding to the target identification code; or listening to signaling, for indicating that subframe transmission ends, transmitted by the base station, so as to determine the starting point of the channel assessment time according to a last subframe of downlink transmission and the number of symbols occupied by the last subframe, which are indicated by the signaling for indicating that the subframe transmission ends.

2. The channel assessment method according to claim 1, wherein the setting channel assessment time in a subframe after the subframe n and before the subframe n+i comprises:

setting a starting point of the channel assessment time at a starting point of any one subframe after the subframe n and before the subframe n+i.

3. The channel assessment method according to claim 1, wherein the setting channel assessment time in a subframe after the subframe n and before the subframe n+i comprises:

setting a starting point of the channel assessment time at a starting point of a designated symbol within any one subframe after the subframe n and before the subframe n+i.

4. The channel assessment method according to claim 3, wherein the designated symbol comprises:

a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, or a thirteenth symbol within the any one subframe.

5. The channel assessment method according to claim 1, further comprising:

if it is detected that the uplink channel is in a clear state before a starting point of the subframe n+i, transmitting an initial signal or a reservation signal, and occupying the uplink channel at the starting point of the subframe n+i to transmit the uplink data; or if it is detected that the uplink channel is in the clear state before the starting point of the subframe n+i, performing a self-deferral process, and after the self-deferral process is performed and before the starting point of the subframe n+i, performing a channel assessment process for a predetermined duration; when it is detected that the uplink channel is in the clear state in the channel assessment process for the predetermined duration, occupying the uplink channel to transmit the uplink data; and when it is detected that the uplink channel is in a busy state in the channel assessment process for the predetermined duration, not transmitting the uplink data.

6. The channel assessment method according to claim 5, wherein the predetermined duration is 16 μs+M×9 μs, wherein M is equal to 1 or 2.

7. The channel assessment method according to claim 1, wherein the value of i is 1, 2, 3, or 4.

8. The channel assessment method according to claim 1, further comprising:

when any one subframe occupies the uplink channel to transmit the uplink data, indicating that the time starting point for transmitting the uplink data is the starting point of the any one subframe and lengths of fourteen symbols or lengths of thirteen symbols of the any one subframe are continuously occupied.

9. A channel assessment method when a LTE system operates in an unlicensed band, applied by a base station, comprising:

transmitting an uplink scheduling instruction in a subframe n to a terminal to instruct the terminal to transmit uplink data in a subframe n+i by using an allocated resource; and notifying a starting point of channel assessment time to the terminal, so that the terminal sets the channel assessment time in a subframe after the subframe n and before the subframe n+i; and wherein the notifying the starting point of channel assessment time to the terminal comprises:

transmitting multiple configuration manners of the starting point of the channel assessment time and identification codes corresponding to the configuration manners to the terminal through radio resource control (RRC) signaling, and transmitting a target identification code to the terminal through downlink control information (DCI) signaling, so that the terminal determines the starting point of the channel assessment time according to the configuration manner corresponding to the target identification code; or transmitting the target identification code to the terminal through downlink control information (DCI) signaling, so that the terminal determines a configuration manner corresponding to the target identification code according to a correspondence between identification codes and the configuration manners of the starting point of the channel assessment time, which is stored in the terminal, and determines the starting point of the channel assessment time according to the configuration manner corresponding to the target identification code; or transmitting signaling for indicating that subframe transmission ends to the terminal, wherein the signaling for indicating that the subframe transmission ends is configured to indicate a last subframe of downlink transmission and the number of symbols occupied by the last subframe, so that the terminal determines the starting point of the channel assessment time according to the last subframe and the number of symbols occupied by the last subframe.

10. A base station, comprising at least one processor; and a memory communicably connected with the at least one processor for storing instructions executable by the at least one processor, wherein the instructions when executed by the at least one processor causes the at least one processor to perform the channel assessment method according to claim 9.

11. A terminal, comprising at least one processor; and a memory communicably connected with the at least one processor for storing instructions executable by the at least one processor, wherein the instructions when executed by the at least one processor causes the at least one processor to perform:

receiving an uplink scheduling instruction transmitted by a base station in a subframe n, wherein the uplink scheduling instruction is configured to instruct the terminal to transmit uplink data in a subframe n+i by using an allocated resource; and setting channel assessment time in a subframe after the subframe n and before the subframe n+i, so as to detect a clear or busy state of an uplink channel to be occupied by the terminal; and wherein the instructions when executed by the at least one processor causes the at least one processor to further perform:

receiving multiple configuration manners of the starting point of the channel assessment time and identification codes corresponding to the configuration manners, which are transmitted by the base station through radio resource control (RRC) signaling, and receiving a target identification code transmitted by the base station through downlink control information (DCI) signaling, so as to determine the starting point of the channel assessment time according to a configuration manner corresponding to the target identification code; or receiving the target identification code transmitted by the base station through downlink control information (DCI) signaling, so as to determine the configuration manner corresponding to the target identification code according to a correspondence between identification codes and the configuration manners of the starting point of the channel assessment time, which is stored in the terminal, and determine the starting point of the channel assessment time according to the configuration manner corresponding to the target identification code; or listening to signaling, for indicating that subframe transmission ends, transmitted by the base station, so as to determine the starting point of the channel assessment time according to a last subframe of downlink transmission and the number of symbols occupied by the last subframe, which are indicated by the signaling for indicating that the subframe transmission ends.

12. The terminal according to claim 11, wherein the setting channel assessment time in a subframe after the subframe n and before the subframe n+i comprises:

setting a starting point of the channel assessment time at a starting point of any one subframe after the subframe n and before the subframe n+i.

13. The terminal according to claim 11, wherein the setting channel assessment time in a subframe after the subframe n and before the subframe n+i comprises:

setting a starting point of the channel assessment time at a starting point of a designated symbol within any one subframe after the subframe n and before the subframe n+i.

14. The terminal according to claim 13, wherein the designated symbol comprises:

a first symbol within the any one subframe, a fourth symbol within the any one subframe, a seventh symbol within the any one subframe, a tenth symbol within the any one subframe, an eleventh symbol within the any one subframe, a twelfth symbol within the any one subframe, or a thirteenth symbol within the any one subframe.

15. The terminal according to claim 11, wherein the instructions when executed by the at least one processor further causes the at least one processor to perform:

if it is detected that the uplink channel is in a clear state before a starting point of the subframe n+i, transmitting an initial signal or a reservation signal, and occupying the uplink channel at the starting point of the subframe n+i to transmit the uplink data; or if it is detected that the uplink channel is in the clear state before the starting point of the subframe n+i, performing a self-deferral process, and after the self-deferral process is performed and before the starting point of the subframe n+i, performing a channel assessment process for a predetermined duration; when it is detected that the uplink channel is in the clear state in the channel assessment process for the predetermined duration, occupying the uplink channel to transmit the uplink data; and when it is detected that the uplink channel is in a busy state in the channel assessment process for the predetermined duration, not transmitting the uplink data.

16. The terminal according to claim 15, wherein the predetermined duration is 16 μs+M×9 μs, wherein M is equal to 1 or 2.

17. The terminal according to claim 11, wherein the instructions when executed by the at least one processor further causes the at least one processor to perform:

when any one subframe occupies the uplink channel to transmit the uplink data, indicating that the time starting point for transmitting the uplink data is the starting point of the any one subframe and lengths of fourteen symbols or lengths of thirteen symbols of the any one subframe are continuously occupied.

* * * * *

UNITED STATES PATENT AND TRADEMARK OFFICE
CERTIFICATE OF CORRECTION

PATENT NO.         : 10,667,298 B2
APPLICATION NO.    : 16/068648
DATED              : May 26, 2020
INVENTOR(S)        : Li et al.

It is certified that error appears in the above-identified patent and that said Letters Patent is hereby corrected as shown below:

In the Claims
In Claim 1, at Column 18, Line 46, add "a" before "channel".
In Claim 1, at Column 18, Line 51, delete "the" before "starting" and insert therefor -- a --.
In Claim 1, at Column 18, Line 52, delete "the" before "channel" and insert therefor -- a --.
In Claim 1, at Column 18, Line 53, add "multiple" before "configuration".
In Claim 1, at Column 18, Line 58, delete "the" before "starting" and insert therefor -- a --.
In Claim 1, at Column 18, Line 61, delete "the" before "target" and insert therefor -- a --.
In Claim 1, at Column 18, Line 63, delete "the" before "configuration" and insert therefor -- a --.
In Claim 1, at Column 18, Line 66, delete "the" before "configuration".
In Claim 1, at Column 18, Line 66, delete "the" before "starting" and insert therefor -- a --.
In Claim 1, at Column 18, Line 67, delete "the" before "channel" and insert therefor -- a --.
In Claim 1, at Column 19, Line 1, delete "the" before "starting" and insert therefor -- a --.
In Claim 1, at Column 19, Line 5, add "a" before "subframe".
In Claim 1, at Column 19, Line 7, delete "the" before "starting" and insert therefor -- a --.
In Claim 1, at Column 19, Line 9, delete "the" before "number" and insert therefor -- a --.
In Claim 2, at Column 19, Line 13, delete "the" before "channel" and insert therefor -- a --.
In Claim 3, at Column 19, Line 20, add "a" before "channel".
In Claim 9, at Column 20, Line 8, add "a" before "channel".
In Claim 9, at Column 20, Line 12, add "the" before "channel".
In Claim 9, at Column 20, Line 14, delete "the" before "starting" and insert therefor -- a --.
In Claim 9, at Column 20, Line 15, delete "the" before "channel" and insert therefor -- a --.
In Claim 9, at Column 20, Line 16, add "multiple" before "configuration".
In Claim 9, at Column 20, Line 22, delete "the" before "configuration" and insert therefor -- a --.
In Claim 9, at Column 20, Line 24, delete "the" before "target" and insert therefor -- a --.
In Claim 9, at Column 20, Line 29, delete "the" before "configuration".
In Claim 9, at Column 20, Line 29, delete "the" before "starting" and insert therefor -- a --.
In Claim 9, at Column 20, Line 30, delete "the" before "channel" and insert therefor -- a --.
In Claim 9, at Column 20, Line 31, delete "the" before "starting" and insert therefor -- a --.
In Claim 9, at Column 20, Line 35, add "a" before "subframe".
In Claim 9, at Column 20, Line 39, delete "the" before "number" and insert therefor -- a --.

Signed and Sealed this
Twenty-seventh Day of May, 2025

Coke Morgan Stewart
*Acting Director of the United States Patent and Trademark Office*

CERTIFICATE OF CORRECTION (continued)
U.S. Pat. No. 10,667,298 B2

In Claim 11, at Column 20, Line 62, add "a" before "channel".
In Claim 11, at Column 21, Line 4, delete "the" before "starting" and insert therefor -- a --.
In Claim 11, at Column 21, Line 5, delete "the" before "channel" and insert therefor -- a --.
In Claim 11, at Column 21, Line 6, add "multiple" before "configuration".
In Claim 11, at Column 21, Line 11, delete "the" before "starting" and insert therefor -- a --.
In Claim 11, at Column 21, Line 14, delete "the" before "target" and insert therefor -- a --.
In Claim 11, at Column 21, Line 16, delete "the" before "configuration" and insert therefor -- a --.
In Claim 11, at Column 21, Line 19, delete "the" before "configuration".
In Claim 11, at Column 21, Line 19, delete "the" before "starting" and insert therefor -- a --.
In Claim 11, at Column 21, Line 20, delete "the" before "channel" and insert therefor -- a --.
In Claim 11, at Column 21, Line 21, delete "the" before "starting" and insert therefor -- a --.
In Claim 11, at Column 21, Line 25, add "a" before "subframe".
In Claim 11, at Column 21, Line 27, delete "the" before "starting" and insert therefor -- a --.
In Claim 11, at Column 21, Line 29, delete "the" before "number" and insert therefor -- a --.
In Claim 12, at Column 21, Line 32, delete second "the" before "setting".
In Claim 12, at Column 21, Line 33, add "a" before "channel".
In Claim 13, at Column 21, Line 39, add "a" before "channel".